Aug. 20, 1968  JEAN-PIERRE DUBOIS  3,397,531
BEARING MEANS FOR ARBOR OF A WATCH RUNNER
Filed June 24, 1966

United States Patent Office 3,397,531
Patented Aug. 20, 1968

3,397,531
BEARING MEANS FOR ARBOR OF A WATCH RUNNER
Jean-Pierre Dubois, Le Locle, Switzerland, assignor to Fabrique d'Horlogerie Chs. Tissot et Fils S.A., Le Locle, Switzerland, a company limited by shares of Switzerland
Filed June 24, 1966, Ser. No. 560,235
Claims priority, application Switzerland, July 1, 1965, 9,177/65
8 Claims. (Cl. 58—140)

The present invention is directed to a bearing means of the type comprising a self-lubricating cushion which is fixedly supported in a base member, said cushion including a cylindrical cavity for pivotally receiving the arbor of a watch runner.

In heretofore known devices of this type the cushion is molded in place directly onto the base member, said member being in the mold while the liquid plastic material of the cushion is being injected thereinto, the resulting article being such that said cushion forms a radially internal member concentric with the radially external base member.

The mold is so shaped as to provide a radial overlapping of the plastic cushion over the opposite radial surfaces of the base member, this overlapping being analogous to the opposite heads on a rivet and serving to anchor the cushion relative to the base member.

A problem presented in known devices has arisen from the fact that since the cylindrical cavity extends completely through the two opposite radial surfaces of the cushion it is necessary to provide a male pin member on one part of the mold and a corresponding female cavity in the other part of the mold for receiving the male pin member therein. Repeated use of such a mold causes a wearing away of the sharp outer edge on the female mold cavity and this wearing away results in a burr along one edge of the cushion cavity.

An object of this invention, therefore, is to provide a type of bearing construction which eliminates the tendency for a burr to result along the cushion cavity, and this object is realized by providing a blind bearing cavity which extends only partially into the cushion rather than completely therethrough. Such a blind cylindrical cavity merely requires the male pin member on one part of the mold but not any corresponding female cavity on the other part of the mold.

Figure 1:
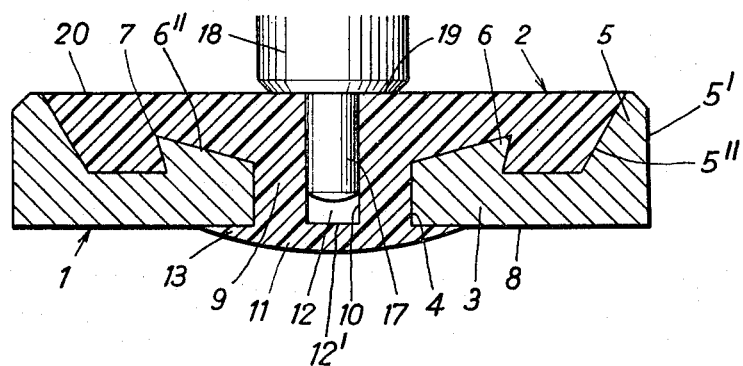
Figure 2:
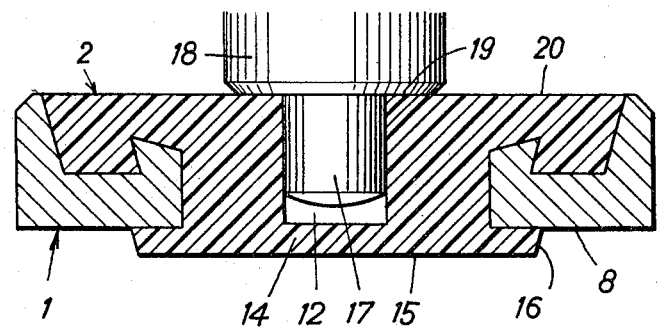

The objects of the present invention and the realization thereof will be better understood from the following description of two preferred embodiments which are referred to the accompanying drawing in which:

FIGURES 1 and 2 are axial sectional views through two respective embodiments of the disclosed invention.

With reference to FIGURE 1, the bearing consists of a metal base member or bearing housing 1 within which is mounted a cushion 2 of self-lubricating plastic material. Housing 1 is preferably cut as a single piece circular dish including a base portion 3 provided with a central cylindrical opening 4. The outer periphery of base 3 comprises an axially extending rim 5 having a cylindrical outer surface 5' and a frusto-conical inner surface 5" which flares outwardly towards the edge of rim 5. Housing 1 includes a second rim 6 coaxial with rim 5 and shaped generally in the form of a trapezoid. The rim 6 is defined by a frusto-conical surface 6" which flares outwardly in the same general direction as surface 5" and terminates in circular edge 7 which is considerably below the topmost edge of surface 5". The inner side of rim 5 is an extension of cylindrical wall 4. Housing 1 includes a flat radial face 8 extending from wall 4 to wall 5', said face 8 defining one outermost radial wall of said housing.

Cushion 2 consists of a mass of plastic material which has been molded in place on the housing 1 so as to fill all the free space enclosed by walls 5" and 4 from the topmost edge of wall 5" to the bottom edge of wall 4, this resulting in a cylinder 9 whose outer wall is delimited by wall 4 and whose inner wall is delimited by wall 10. Wall 10 defines a blind ended cylindrical cavity 12 which results from the fact that cushion 2 is molded between mating mold members one of which comprises a male pin member configured in correspondence with cavity 12. Tthe other of the mold members is configured so as to provide the cushion with a head portion 11, analogous to a rivet or screw head, which radially overlaps the flat radial face 8 of housing 1. Head 11 serves to anchor cushion 2 relative to housing 1.

The embodiment of FIGURE 2 is analogous to that of FIGURE 1 excepting as to shape and size of the respective portions. For example, in FIGURE 2 the axial length and diameter of cavity 12 vary from those of the cavity in FIGURE 1. Further, in FIGURE 2 the head portion 14 is defined by a flat outer face 15 having a frusto-conical edge portion 16 in contrast to the convex face of head portion 11.

In both embodiments, the blind end wall 12' of cavity 12 is parallel to wall 8 on housing 1.

For the manufacture of the bearings described, there is used a mold, one of the parts of which has a pin intended to form the recess 12. This pin terminates in a flat front face, which is parallel with the face 8, while the other part of the mold is provided, opposite said pin, with a concavity in the form of a spherical segment in the case of FIGURE 1 and in the form of a frustum of a cone of small height in the case of FIGURE 2. Upon the injection of the plastic material into the mold the free space between the bottom of said cavity and the pin is filled by the material which forms the head 11 or 14. The result is that it is impossible for burrs to be formed at any place along the cavity 12. Furthermore, the flange 13, as well as the rims 5 and 6, assure a complete anchoring of the bearing-bed.

The bearings described are intended to be fastened by means of housing 1 to a frame element of a watch movement, such as a pillar plate or a bridge, and to guide the cylindrical pivot pin 17 of the arbor 18 of a runner of said movement. This pivot pin 17 fits in the recess 12, the depth of which is greater than the height of the pivot pin. The arbor 18 includes at the base of the pivot pin a flat annular shoulder 19 which rests on the upper face 20 of the housing 2 around the cavity 12. The axial play of the runner can be adjusted by adjusting the bearing in the opening of the frame element which supports it. The presence of the heads 11 and 14 avoids penetration of dust into the bearing from the outside. These heads therefore fulfill the function of protecting the pivot pin 17 against becoming dirty.

What is claimed is:

1. A watch runner bearing means comprising a bearing cushion having a blind ended cylindrical cavity therein and an upper outer face portion extending radially from said cavity, an arbor including an axially extending pivot pin and a shoulder extending radially from the base of said pin, said pin extending into said cavity with said shoulder resting against said face portion.

2. The bearing means of claim 1, further comprising a housing member adapted to be fastened to a frame element of a watch movement, said cushion being fixedly mounted in said housing member, said housing member including a lower radial face portion and a central axial opening extending through said face portion, said cushion including a cylindrical portion within said central axial opening, said cylindrical portion interiorly defining said cylindrical cavity and including a lower radially extending head portion overlapping said lower radial face of said housing member and defining the blind end of said cushion cavity.

3. The bearing means of claim 2, wherein said head portion is defined by an outer lower face which is parallel with said lower face of said support member.

4. The bearing means of claim 2, said support member being metallic and said cushion being of one-piece molded plastic construction.

5. The bearing means of claim 2, said head portion having an outer convex face.

6. The bearing means of claim 2, said head portion having an outer flat face delimited by a frusto-conical side edge face.

7. The bearing means of claim 4, said housing member being formed by circular base portion and two radially spaced apart rims which extend axially from one face of said base portion, the outer of said rims defining the outer periphery of said housing member, the inner of said rims being lower in axial extent than the outer of said rims, said cushion filling the free space defined between said outer rim and said blind ended cavity.

8. The bearing means of claim 7, said inner rim being trapezoidal in cross-sectional shape.

References Cited

UNITED STATES PATENTS

| 2,741,516 | 5/1956 | Van Deventer | 308—238 |
| 2,956,394 | 10/1960 | DuBois | 58—140 |
| 3,104,136 | 9/1963 | Merriman | 308—238 |

FOREIGN PATENTS

| 657,080 | 9/1951 | England. |
| 329,807 | 5/1958 | Switzerland. |

ROBERT S. WARD, Jr., *Primary Examiner.*

L. H. HAMBLEN, *Assistant Examiner.*